E. L. SHARPNECK.
LUBRICATING JOURNAL BOX.
APPLICATION FILED JUNE 28, 1913.

1,100,403.

Patented June 16, 1914.

Witnesses:
E. C. Murphy
L. B. Weymouth

Inventor:
Ebil L. Sharpneck
by Henry J. Miller
Atty.

UNITED STATES PATENT OFFICE.

ELIEL L. SHARPNECK, OF WINTHROP, MASSACHUSETTS, ASSIGNOR TO ANTI-FRICTION ROLLER BEARING COMPANY, A CORPORATION OF ARIZONA.

LUBRICATING JOURNAL-BOX.

1,100,403.

Specification of Letters Patent. Patented June 16, 1914.

Application filed June 28, 1913. Serial No. 776,354.

*To all whom it may concern:*

Be it known that I, ELIEL L. SHARPNECK, a citizen of the United States, residing at Winthrop, in the county of Suffolk and State of Massachusetts, have invented certain new and useful Improvements in Lubricating Journal-Boxes, of which the following is a specification, reference being had to the accompanying drawings, forming part thereof.

This invention has reference to improvements in lubricating journal boxes having roller bearings.

The object of the invention is to improve the construction of lubricating journal boxes having roller bearings adapted to rotate in said boxes whereby the shaft or axle journaled in the roller bearing and said bearing are held from any considerable longitudinal movement in said journal box and whereby, when necessary, the roller bearing as a whole may be removed from the journal box.

The invention consists in the improved journal box and its closure as hereinafter more fully described and pointed out in the claim.

Figure 1:
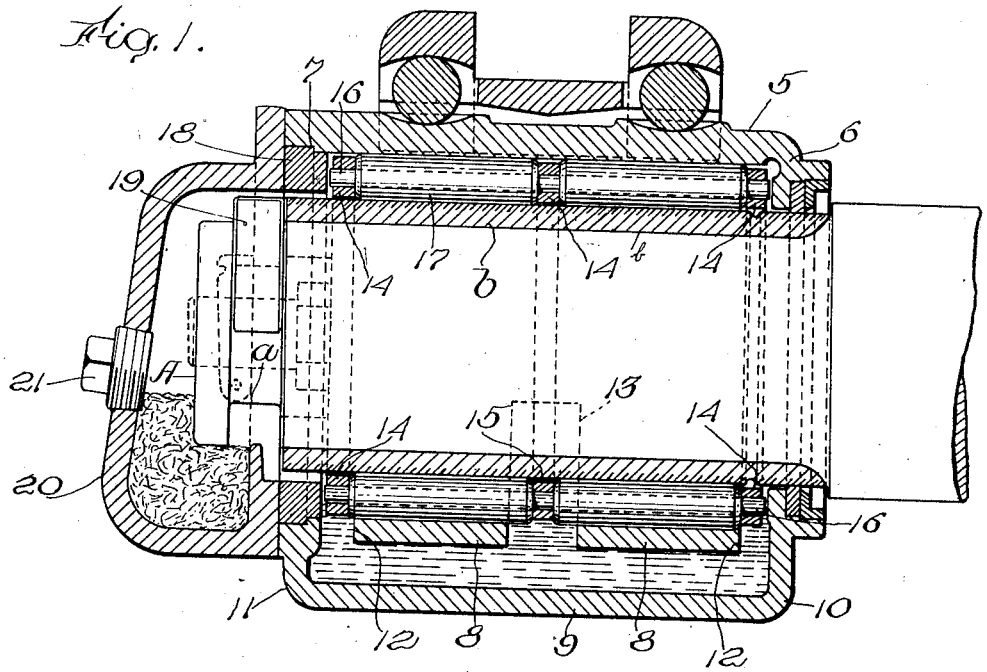
Figure 2:
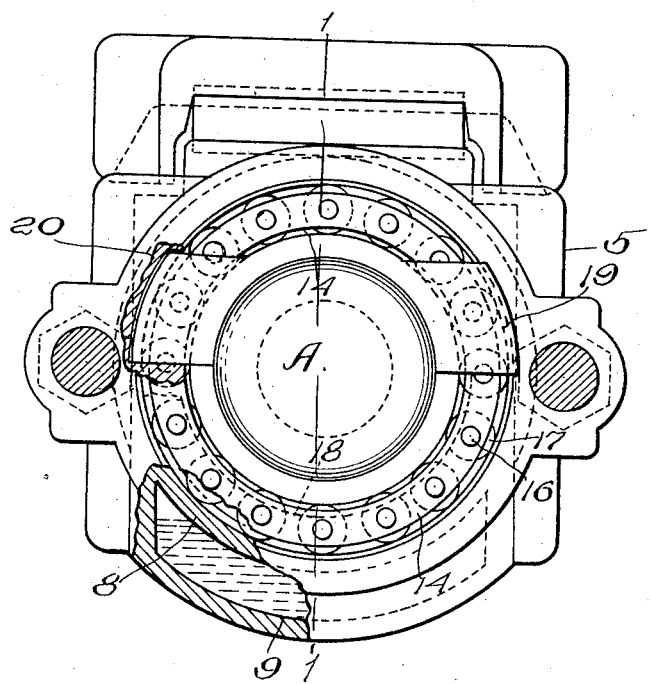

Figure 1, represents a longitudinal vertical sectional view of the improved journal box as taken on line 1—1 Fig. 2. Fig. 2, represents an end view of the same with the cap removed, except for a small fragment, parts of the box being broken away.

Similar characters of reference designate corresponding parts throughout.

As shown in the drawing the journal box comprises the outer shell or casing 5 having at its inner end the wall 6 and at its outer end the stepped shoulder 7. The concentric bore of the casing 5 is completed, at the lower portion by the ways 8, 8 integral with said wall 5 and with the depending integral wall 9 having the ends 10 and 11 which is adapted to contain oil or forms an oil chamber through which said ways extend and which communicates with the bore or bearing of the box by means of the slots or spaces 12, 12 and 13.

Within the bore or bearing of the box or casing 5 and sustained by the ways 8, 8 is a roller bearing cage comprising the rings 14, 14 and 15 which are spaced apart on the rods or shafts 16, 16 so as to register with the spaces 12, 12 and 13 while on said rods or shafts 16, 16 are journaled the rolls 17, 17 which bear at their ends against the rings 14, 14 and 15. The diameter of the shoulder 7 is such that the roller bearing thus formed may slide through the opening of such shoulder into place on to the ways 8, 8 until the inner ring 12 comes in contact with the inturned wall 6 of casing 5 and, as it is desirable to provide the outer end of the box with an end bearing somewhat similar, in its function to said wall 6, and at the same time to increase the height of the wall 11 so that the level of the oil in the reservoir formed by wall 9 and its ends may be above the upper surface of the ways 8, 8 I provide the stepped shoulder 7 with the ring 18 removably seated in said shoulder. The shaft A journaled in said roller bearing has at its outer end the annular groove *a* with which is engaged the yoke piece 19 having bearings at its ends against the face of shoulder 7, and this yoke piece 19 is held in place by the end closure 20 having the screw plug 21 and secured to the casing 5 in any manner so that the casing 5, the roller bearing and said shaft A are held together against material independent lengthwise movement of said parts. Preferably the shaft or axle A is supplied with the sleeve *b* of comparatively soft steel having a hardened peripheral skin but this sleeve does not necessarily form part of the present invention. When ready for operation oil is supplied to the reservoir formed by the wall 9 until the oil rises to the rods or shafts 16 of the lowermost rolls 17, 17 so that oil is supplied to the bores of said rolls which oil, in the rotation of said roller bearing is carried around shaft or axle A and, to a large extent, drains from the rolls 17, 17, when in their uppermost position, on to the shaft or axle A or on to its sleeve *b* as the case may be.

Having thus described my invention I claim as new and desire to secure by Letters Patent.

A lubricating journal box comprising a casing having at its lower portion an oil receptacle and having a bore the lower wall of which has integral curved ways spaced from the end walls of said casing and from each other by slots, the end wall of said casing having a stepped opening of a diameter equal to that of said bore, a roller bearing cage slidable through said opening into said bore, a ring fitting into said opening, and a closure for the open end of said casing, said closure having a clearance chamber to receive the end of the shaft journaled in the box and an integral flange upstanding interiorly and exteriorly of said closure and bearing against the end of said journal box and said ring whereby the joint between said ring and said box is closed, substantially as described.

ELIEL L. SHARPNECK.

Witnesses:
HENRY J. MILLER,
ESTHER C. MURPHY.

Copies of this patent may be obtained for five cents each, by addressing the "Commissioner of Patents, Washington, D. C."